Aug. 12, 1952 B. S. WILLIAMS 2,606,747
TEMPERATURE CONTROL APPARATUS FOR MACHINES
Filed Nov. 2, 1948 2 SHEETS—SHEET 1
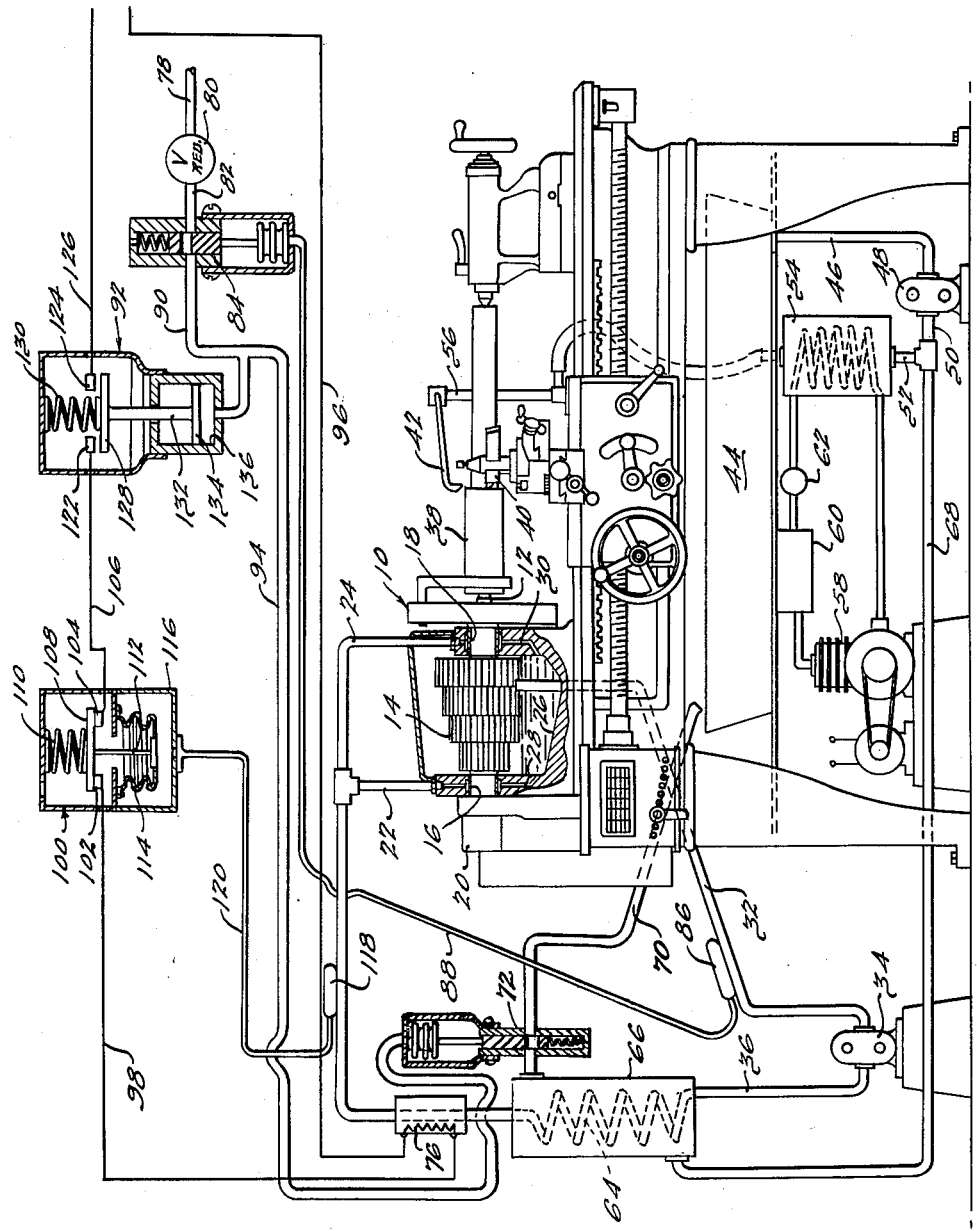
INVENTOR.
Burdell S. Williams.
BY
Harness and Harris
ATTORNEYS.

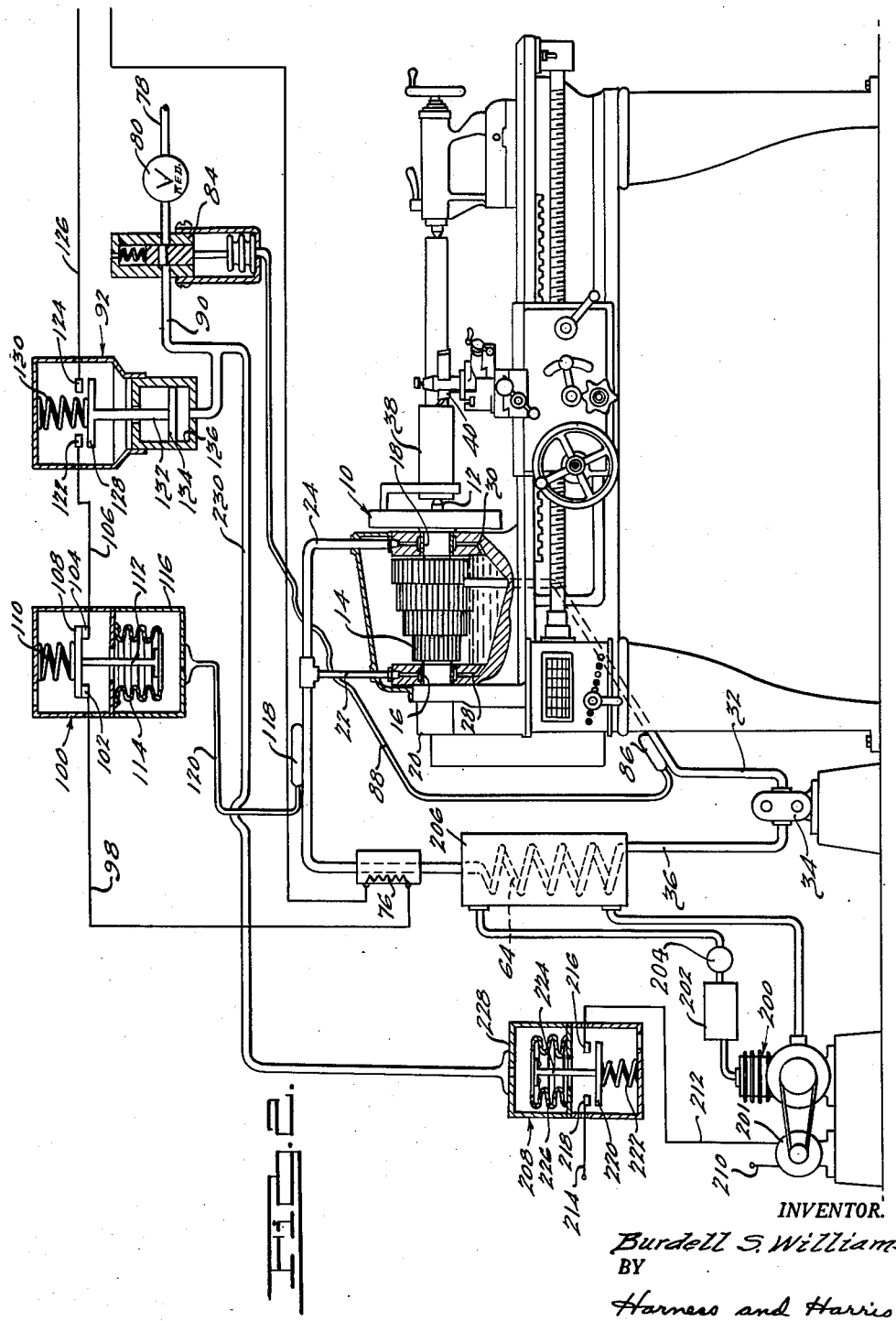

UNITED STATES PATENT OFFICE 2,606,747

TEMPERATURE CONTROL APPARATUS FOR MACHINE

Burdell S. Williams, Larchmont, N. Y., assignor to Chrysler Corporation, Highland Park, Mich., a corporation of Delaware Application November 2, 1948, Serial No. 57,970

6 Claims. (Cl. 257—3)

This invention relates to apparatus for maintaining components of machines at a substantially constant temperature during operation of the machines.

It has been found in machines where relatively moving parts are designed to be held to close tolerances that the temperature variations in these parts are capable of producing sufficient relative expension and contraction of the parts to cause substantial deviation from the desired tolerances. It is a principal object of the invention to provide apparatus which will hold the above tolerances at a substantially constant value by eliminating the expansion and contraction normally caused by temperature changes. This is accomplished by selectively heating or cooling the parts as required to maintain a constant temperature.

One of the most useful applications of the invention is found in machine tools and the invention will be described as associated with a machine tool although it is to be understood that the same principles of temperature control could be beneficially applied to other machinery, such as internal combustion engines, electric motors etc., where it would be desirable to keep operating parts at an optimum temperature to hold selected tolerances between the parts.

In the preferred application of the invention to machine tools it has been found that by maintaining the lubricating oil of a machine tool at a constant temperature that undesired movement of the tool relative to the work is minimized so that the accuracy of the machine is greatly increased. Temperature control of the lubricating oil of the machine tool also permits the speed of the machine to be increased because heat developed by operation of the machine can be controlled so that it does not become excessive. Other benefits which occur as a result of the temperature control of the machine tool are that tool life is increased and that the type of lubrication in the machine tool becomes less critical. Heretofore, lubrication of machine tools has been predominantly accomplished by systems which minimize the amount of oil contacting the head or casing of the machine tool in order to minimize expansion of the head as a result of its contact with hot lubricating oil. However, with the temperature of the lubricating oil controlled, this limitation on the type of lubricating system need no longer be imposed. In fact, it may in many applications, be found desirable to increase the oil contact with machine parts such as the head or bed to increase the heat transfer therebetween.

Previous efforts have recognized that some cooling of the lubricating oil or coolant of a machine tool is desirable. However, constant temperatures have not been maintained. Some predetermined temperature, about in the neighborhood of between 68° F., and 90° F., is an optimum temperature for the operation of each particular machine tool and it is desirable to raise or lower the temperature of the tool to the predetermined temperature before work is begun and then to have available cooling and heating systems of sufficient capacity to maintain this temperature throughout the period of operation of the machine. It has been found that if the predetermined temperature is established at too high a value such as a temperature above the normal operating temperature of the machine that although a constant temperature might be obtained, certain disadvantages would also be obtained. The work under these conditions would be too hot to touch and the work may be warped or even annealed by the heat. Therefore, it is an object of this invention to operate the machine tools at a predetermined temperature which is lower than the temperature normally attained during the operation of a machine and to initially heat the machine to the predetermined temperature before operation is begun so that under all conditions when the machine is operating the predetermined temperature is maintained.

In the drawings:

Fig. 1 is a diagrammatic view of a machine tool in which the coolant is used to transfer heat away from the lubricating oil; and Fig. 2 is a diagrammatic view of a modified form of the invention in which the lubricating oil is in direct heat exchange relationship with a refrigeration apparatus.

In Fig. 1 a lathe 10 has been illustrated as the machine tool to which the invention is applied. Although a lathe has been illustrated it is to be understood that various other machine tools can with equal ease have the invention applied thereto. The invention is adapted for application to grinders, milling machines, drilling machines, automatic screw machines, honing machines, gear shaping machines, profiling machines, broaching machines, and other conventional or specialized machine tools. The lathe 10 is provided with a conventional work-receiving spindle 12 carried by a geared shaft 14 adapted to be driven by a suitable source of power (not shown). The shaft 14 is rotatably journaled in bearings 16 and 18 which have pipes 22 and 24 connected thereto for the delivery of lubricating oil to the bearings. The lathe has a housing 20 which is provided with a sump 26 in which the lubricating oil accumulates after its passage over bearings 16 and 18. A pair of passages 28 and 30 provided in housing 20 serve as drains for the delivery of oil from bearings 16 and 18 to sump 26. A pipe 32 connects the sump 26 with an oil pump 34 which discharges oil to a pipe 36 which is connected in fluid flow relationship with both pipes 22 and 24. There is thus provided a conventional lubricating oil circulating system so that oil may be drained from sump 26 through pipe 32 and pumped by pump 34 through pipe 36 to pipes 22 and 24 which deliver oil to the bearings 16 and 18. The oil is then drained from the bearings back into sump 26 through the passages 28 and 30. Means will be described herein to maintain the temperature of the lubricating oil in this system at a constant temperature.

The lathe 10 is illustrated as carrying a work piece 38 which is being operated upon by a cutting tool 40. A conventional nozzle 42 is illustrated as carried by the lathe 10 and so positioned that it is operable to discharge coolant or cutting fluid onto the work adjacent the cutting tool 40. A sump 44 is provided in the base of the lathe for the accumulation of used coolant which falls by gravity therein. A conventional system for the circulation of coolant from sump 44 to work 38 is provided by a pipe 46 connected to the sump and to a pump 48. The pump 48 is operable to elevate coolant through pipes 50, 52, heat exchanger 54, pipe 56 and nozzle 42. A conventional refrigerating system including a motor driven compressor 58, a condenser diagrammatically illustrated at 60, an expansion valve 62 and the evaporator or heat exchanger 54 is illustrated as associated with the coolant circulating system in order to cool the coolant.

The pipe 36 heretofore mentioned with reference to the lubricating oil system is provided with a coiled portion 64 which is surrounded by a tank 66 adapted to serve as a heat exchanger. The tank 66 is connected by a pipe 68 with the pipe 50 and coolant pump 48. A pipe 70 connects tank 66 with coolant sump 44. There is thus provided a supplementary path for coolant from pump 48 through pipes 50 and 68, tank or heat exchanger 66 and pipe 70 to sump 44. The passage of coolant through its supplemental path is controlled by a valve 72 which is interposed within the pipe 70. This supplemental path for coolant provides a means under the control of valve 72 for cooling lubricating oil in pipe 36 by the selective passage of the refrigerated coolant in heat exchange relationship therewith.

The pipe 36 in the lubricating oil system is also provided with an electric resistance heating element 76 which is positioned in heat exchange relationship with the pipe and operable to heat the oil therein when energized. The energization of the resistance heater 76 is controlled by a means to be described herein.

The valve 72 and the resistance heater 76 are both controlled by means which will now be described. An air pressure control system is preferably employed. A pipe 78 is connected to any conventional source of supply of air under pressure and has a pressure reducing valve diagrammatically illustrated at 80 interposed in it to reduce the air pressure to a suitable value. A pipe 82 connects the pressure reducing valve with a valve 84 which is associated with a heat bulb 86 positioned adjacent the lubricating oil line 32 and responsive to the temperature of oil therein. The valve 84 is responsive to expansion and contraction of the fluid medium contained in the heat bulb 86 and a line 88 connects the heat bulb with the valve 84. The valve 84 is adapted to open when the temperature of the heat bulb 86 is low and is operable to close when the temperature of the heat bulb 86 is high and the fluid medium therein is expanded. A pipe 90 is connected to valve 84 and to a heater control switch 92. A branch 94 of pipe 90 is connected to valve 72. It will thus be seen that both the valve 72 and the switch 92 are in direct fluid flow communication with the pipe 90 and valve 84.

The resistance heater 76 previously referred to has one terminal thereof connected to an electric line 96 which is connected to a source of electric power. The other terminal of the electric resistance heater 76 is connected to a line 98 which has a switch 100 interposed therein. The switch 100 is normally closed and comprises an upper limit control switch which is adapted to interrupt the flow of electric current to the heater 76 when the temperature of the lubricating oil becomes excessive. The switch 100 includes a terminal 102 connected to line 98 and a terminal 104 connected to a line 106. A bar 108 is normally retained in contact with the terminals by a spring 110 to provide an electric circuit through the switch. The bar 108 has a rod 112 secured thereto which is connected to an expansible and contractable bellows 114. The bellows 114 is positioned within a housing 116 and the housing 116 is connected in fluid flow relationship with a heat bulb 118 by a tube 120. The heat bulb 118 is positioned in close proximity to oil pipe 36. It will thus be seen that when the oil temperature becomes excessive and the fluid medium in the bulb 118 expands the bellows 114 is collapsed and the bar 108 raised out of contact with terminals 102 and 104 to interrupt the flow of electric current to the resistance heater 76. The electric line 106 is connected to a terminal 122 in switch 92. A terminal 124 in switch 92 has a line 126 connected thereto and to the source of electric power. A bar 128 is adapted to electrically connect terminals 122 and 124 but is urged out of contact with these terminals by a spring 130. The bar 128 carries a valve stem 132 which is connected to a piston 134 located in a cylinder 136 provided in the housing of valve 92. A cylinder 136 is connected in fluid flow communication with the pipe 90 so that the air discharged from valve 84 may move piston 134. It will thus be seen that the switch 92 is closed when sufficient air pressure is admitted to the cylinder 136. This air pressure is in turn admitted to cylinder 136 when valve 84 is opened in response to the existence of a temperature in heat bulb 86 which is below a predetermined minimum.

The control for the valve 72 operates to open and close the valve 72 in response to variations in air pressure in the pipe 94. When a predetermined amount of air pressure is present in the line 90 the switch 92 is closed and the heater 76 energized. However, valve 72 is, as illustrated, normally open but closed when the air pressure in line 94 is high. When valve 84 closes in response to expansion of the fluid medium in heat bulb 86 as an incident to the temperature of the oil exceeding a predetermined maximum the pressure in pipe 94 decreases and the valve 72 is urged to its open position which permits coolant to flow through the supplemental circuit including pipe 68, tank 66, pipe 70, and sump 44. The coolant in flowing through this supplemental circuit passes in heat exchange relation with the oil in turns 64, and since the coolant is refrigerated, heat is, therefore, extracted from the lubricating oil.

Means have been described for heating the lubricating oil, for cooling the lubricating oil and for controlling the heating and cooling. The control means as described does not effect simultaneous heating and cooling but does effect alternate heating and cooling so that the temperature of the lubricating oil is maintained at a constant value. When the machine has been shut down for an interval of time and is at room temperature the heat bulb 86 is usually relatively cool. The valve 84 is therefore open and the switch 92 closed so that heating of the lubricating oil is effected prior to the operation of the machine.

The modified form of the invention illustrated in Fig. 2 is similar to the device in Fig. 1 except that the coolant circuits have not been illustrated and a refrigeration system which operates directly upon the lubricating oil pipe 36 has been substituted therefor. A refrigerating system including a motor driven compressor 200, a condenser diagrammatically illustrated at 202 and an expansion valve 204 are illustrated as being positioned in fluid flow communication with heat exchanger 206 which surrounds turns 64 in lubricating oil pipe 36. Refrigerant is thus passed in heat exchange relationship with the turns 64. The operation of the refrigerating system is controlled by a switch 208 provided in the electric circuit which controls the operation of the motor driven compressor 200. The switch 208 performs a function similar to that performed by the valve 72 in the Fig. 1 form of the invention. A motor 201 is illustrated as being a component of the motor driven compressor set 200 and is provided with an electric line 210 connected to a source of supply of electricity. An electric line 212 is connected to switch 208 and an electric line 214 connects switch 208 with the source of supply of electricity. The switch 208 includes a terminal 216 connected to line 212 and a terminal 218 connected to line 214. A bar 220 is adapted to electrically connect terminals 216 and 218 when in contact therewith. The bar 220 is urged into contact with these terminals by a spring 222. The bar 220 also carries a rod 224 which is connected to an expansible and contractable bellows 226 contained within an airtight housing 228 associated with switch 208. The housing 228 is connected by pipe 230 to air pipe 90 in a manner similar to that in which the pipe 94 was connected to pipe 90 in the Fig. 1 form of the invention. In the Fig. 2 form of the invention when the temperature of the bulb 86 exceeds a predetermined maximum the fluid medium therein expands to close valve 84 which lowers the air pressure in pipe 230. This permits the spring 222 to expand the bellows and close the switch 208 thereby energizing the motor compressor set 200 and initiating a cooling of the lubricating oil.

The alternate heating of the lubricating oil by the resistance heater 76 is accomplished in the same manner as that described with reference to the Fig. 1 form of the invention under the control of the switches 100 and 92.

Although a pneumatic control system has been illustrated and described herein it should be recognized that this was chosen as one means to control both the cooling and heating systems by one temperature sensitive device, namely bulb 86 and that there are other conventional temperature responsive switches and devices which are capable of controlling two circuits in response to upper and lower temperatures and that a pneumatic control system would not therefore always be necessary.

The temperature control of other oils such as the oil used in hydraulic controls in a machine tool may be accomplished by my invention although I have used the lubricating oil system to describe the invention.

I claim:

1. A temperature control system adapted to be associated with a machine tool having a lubricating oil circulating system, said control system including an electric heating device located in heat transfer relation with the oil in said oil system, a refrigerating device operable to withdraw heat from the oil in said oil system, a first air-operated device operable to selectively energize and deenergize said heating device, a second air-operated device operable to render said refrigerating device selectively inoperable and operable to withdraw heat from said oil, an air supply means operatively connected to said first and second air-operated devices, a valve in said air supply means, and means to open and close said valve in response to variations in the temperature of said machine tool.

2. A temperature control system adapted to be associated with a machine tool having a lubricating oil circulating system, said control system including an electric heating device located in heat transfer relation with the oil in said oil system, a refrigerating device operable to withdraw heat from the oil in said oil system, a first air-operated device, a second air-operated device, an air supply means operable to supply air to said first and second air-operated devices, a valve in said air supply means, means to open said valve when the temperature of said oil falls below a predetermined minimum and to close said valve when the temperature of said oil exceeds a predetermined maximum, said first air-operated device being operable to energize said heating device when said valve is open and said second air-operated device being operable to render said refrigerating device operative to withdraw heat from said oil when said valve is closed.

3. A temperature control system adapted to be associated with a machine tool having a lubricating oil circulating system, said control system including an electric heating device located in heat transfer relation with the oil in said oil system, a refrigerating device including an electric motor driven refrigerant compressor and an evaporator coil, said coil being located in heat transfer relation with the oil in said oil system and said refrigerating device being operable to withdraw heat from the oil in said system as an incident to operation of said compressor, a first air-operated device, a second air-operated device, as air supply means operable to supply air to said first and second air-operated devices, a valve in said air supply means, means to open said valve when the temperature of said oil falls below a predetermined minimum and to close said valve when the temperature of said oil exceeds a predetermined maximum, said first air-operated device being operable to energize said heating device when said valve is open and said second air-operated device being operable to energize the electric motor of said refrigerant compressor when the valve is closed.

4. A temperature control system adapted to be associated with a machine tool having a lubricating oil circulating system and a coolant circulating system, said control system including a heating device operable to heat said lubricating oil, a cooling device operable to cool said coolant, a first control means to selectively activate and inactivate said heating device, a second control means to selectively pass said cooled coolant in heat exchange relation with said oil and to bypass said coolant out of heat exchange relation with said oil, temperature responsive means operable to activate said heating device when the temperature of said oil falls below a predetermined minimum and operable to pass said coolant in heat exchange relation with said oil when the temperature of said oil exceeds a predetermined maximum.

5. A temperature control system adapted to be associated with a machine tool having a lubricating oil circulating system and a coolant circulating system, said control system including an electric heating device located in heat transfer relation with the oil in said oil system, a refrigerating device operable to cool said coolant, means defining a first path for the circulation of said coolant in heat exchange relation with said oil and means defining a second path for the circulation of said coolant remote from said oil, a first air-operated device operable to selectively energize and deenergize said heating device, a second air-operated device operable to selectively direct said coolant through said first and said second paths, an air supply means operatively connected to said first and second air-operated devices, a valve in said air supply means and means to open and close said valve in response to variations in the temperature of said machine tool.

6. A temperature control system adapted to be associated with a machine tool having a lubricating oil circulating system and a coolant circulating system, said control system including an electric heating device located in heat transfer relation with the oil in said oil system, a refrigerating device operable to cool said coolant, means defining a first path for the circulation of said coolant in heat exchange relation with said oil and means defining a second path for the circulation of said coolant remote from said oil, a first air-operated device operable to selectively energize and deenergize said heating device, a second air-operated device, an air supply means operable to supply air to said first and second air-operated devices, a valve in said air supply means, means to open said valve when the temperature of said oil falls below a predetermined minimum and to close said valve when the temperature of said oil exceeds a predetermined maximum, said first air-operated device being operable to energize said heating device when said valve is open and said second air-operated device being operable to direct said coolant through said first path when said valve is closed.

BURDELL S. WILLIAMS.

REFERENCES CITED

The following references are of record in the file of this patent:

UNITED STATES PATENTS

| Number | Name | Date |
| --- | --- | --- |
| 2,125,889 | Crump | Aug. 9, 1938 |
| 2,221,127 | Bates | Nov. 12, 1940 |
| 2,271,637 | Garrison et al. | Feb. 3, 1942 |
| 2,290,013 | Barnett | July 14, 1942 |
| 2,312,291 | Tyson | Feb. 23, 1943 |
| 2,312,292 | Tyson | Feb. 23, 1943 |
| 2,335,100 | Bauer | Nov. 23, 1943 |
| 2,396,147 | Baldenhofer | Mar. 5, 1946 |